United States Patent

[11] 3,571,767

[72] Inventor Garret Thayer Bush, III
North Cape May, N.J.
[21] Appl. No. 743,706
[22] Filed July 10, 1968
[45] Patented Mar. 23, 1971
[73] Assignee The United States of America as represented by the Commandant of the Coast Guard

[54] ELECTRICAL FILTER ARRANGEMENT
11 Claims, 2 Drawing Figs.

[52] U.S. Cl. 333/76, 333/77
[51] Int. Cl. H03h 7/10
[50] Field of Search 333/75, 76, 12, 73, 70, 77

[56] References Cited

UNITED STATES PATENTS

| | | | |
|---|---|---|---|
| 1,730,903 | 10/1929 | Schmidt et al. | 333/78 |
| 2,138,996 | 12/1938 | Blumlein | 333/75X |
| 2,247,898 | 7/1941 | Wheeler | 333/70X |

OTHER REFERENCES

RADIO ENGINEERS' HANDBOOK - Terman; McGraw-Hill Book Company New York 1943; pages 135— 147 TK6550 T42

*Primary Examiner*—Herman Karl Saalbach
*Assistant Examiner*—Marvin Nussbaum
*Attorneys*—T. Hayward Brown, William W. Fleming and E. Michael Flynn

ABSTRACT: This invention relates to a highly selective electrical filter network composed of passive circuit elements and capable of attenuating or "notching" only selected frequencies from a band while freely passing without substantial attenuation the remaining frequencies in the band. Such a filter network comprises a plurality of series and parallel LC resonant networks or stages alternately disposed in circuit relationship with one another and designed to resonate at the "notching" frequency. The stages are interconnected by means of suitable matching transformers to permit the optimum use of the inherent $Q$ of each inductor.

INVENTOR.
GARRET THAYER BUSH, III
BY
T. Hayward Brown
ATTORNEY

INVENTOR.
GARRET THAYER BUSH, III
BY
T. Hayward Brown
ATTORNEY

ELECTRICAL FILTER ARRANGEMENT

BACKGROUND OF THE INVENTION

In some circuit applications one example being in a Loran navigation system, it is highly desirable to attenuate or notch only selected frequencies from a band of frequencies while effectively passing the remainder of the frequencies in the band without substantial attenuation thereof. This is generally necessary in order to prevent transient or other foreign signals from interrupting, distorting or otherwise interferring with the proper operation of the system. It will at once be recognized that in order to provide a truly selective filter with substantial rejection properties, it is desirable that the network have a high-$Q$value. One general class of filters having the requisite high-$Q$value is the crystal filter; however, a high-$Q$ crystal filter is sometimes caused to "ring" when hit by strong pulses of energy. For this reason, a crystal filter may be highly undesirable.

Most conventional filter networks are composed of T or Pi arrangements of inductances and capacitances. Since the optimum $Q$ value for coils at a given frequency generally occurs only at specific inductance values, standard filter design formulas which specify a certain inductance value to construct $Q$ filter networks may not make optimum use of the inherent $Q$ of the coils in the evolved filter. In fact, in many instances the element values are neither practical nor obtainable with the required $Q$.

Thus, one object of this invention is to provide a highly selective, passive electrical filter network designed to make optimum use of the inherent $Q$ of its components for selectively notching only predetermined frequencies from a band of frequencies while freely passing without substantial attenuation the remainder of the frequencies in the band.

A further object of this invention is to provide a multistage electrical filter network for selectively notching at least one, and in some cases 10 or more, predetermined frequencies from a band without substantially attenuating the remainder of the frequencies in the band.

SUMMARY OF THE INVENTION

In a preferred embodiment of this invention, an electrical filter network is constructed comprising a plurality of passive attenuating stages in electrical series with the path of travel of the frequency band and a plurality of passive attenuating stages in electrical shunt with the path of travel of the frequency band. Each of the attenuating stages is designed to resonate at the frequency to be notched. Preferably, each of the coils is wound to an inductance which possesses the highest $Q$ at the frequency to be notched and all coils are preferably identical with one another in each stage of the network. The series and shunt attenuating stages are alternately disposed in circuit relationship with one another and will operate at differing line impedances to satisfy the design parameters. Thus, impedance-shifting transformers are used for coupling each of the stages to one another and provide the necessary line impedances at each stage in the network to satisfy the standard filter design formulas. Such a system permits each notch element in every stage of the filter network to operate at an independent line impedance and results in a filter network with components having the highest $Q$, in which only the frequencies to be "notched" are attenuated, the remainder of the frequencies in the band being passed freely without substantial attenuation thereof.

Additional objects and advantages of the this invention together with a better understanding thereof may be had by referring to the following detailed description of this invention, together with the accompanying drawings.

DESCRIPTION OF THE PREFERRED EMBODIMENT

Before proceeding with a discussion of this invention it should be noted that it is highly desirable that each of the attenuating means and/or coupling means discussed hereinafter be constructed in modular form as such a construction will facilitate construction and/or repair of the network. In many instances it will be possible, and in fact highly desirable, to combine a plurality of these networks into a single unit to construct a filter network capable of notching multiple interferring frequencies or frequency bands. Also, while the network which produced the response curve shown in FIG. 2 was based on two forms of a maximum flat or Butterworth filter design, it is not the intention of this invention to be limited thereto, as the impedance-shifting principles of this invention may also be applied to various other filter configurations, such as a Tchebyscheff network.

Figure 1:
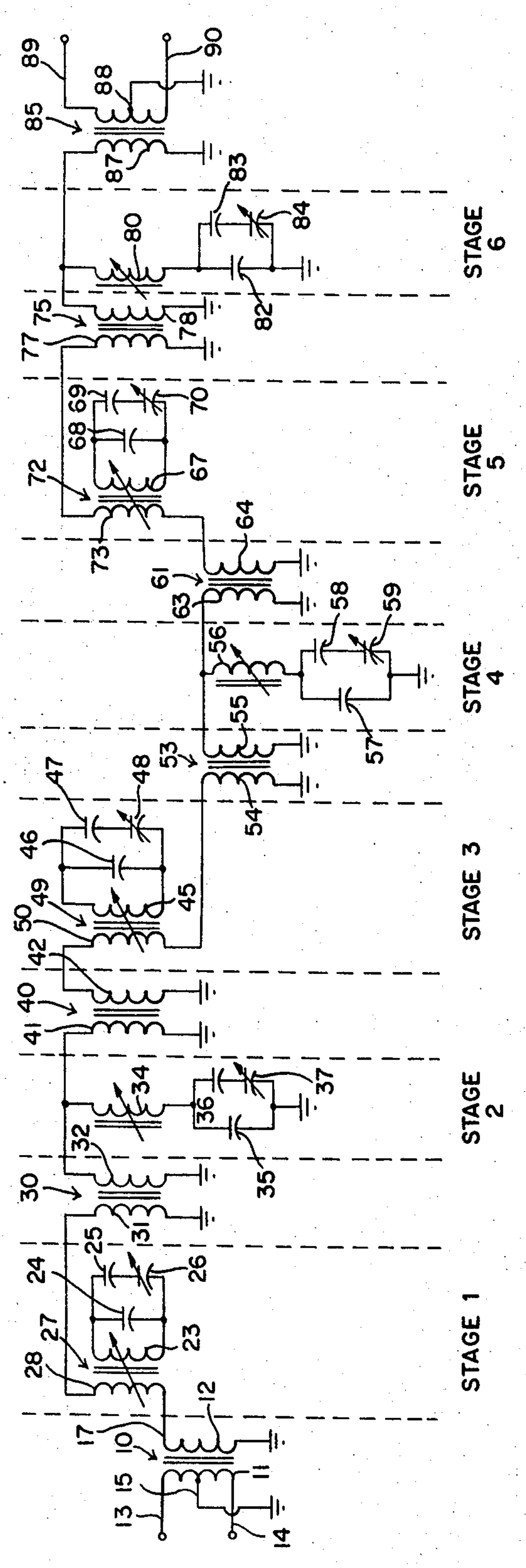
FIG. 1 is a simplified schematic diagram of a preferred embodiment of this invention.

Referring now to FIG. 1 and the abbreviated schematic diagram of the highly selective passive filter network of this invention, there is shown means for receiving a frequency band from a suitable source, such as the antenna coupler of a Loran receiver. In this instance, the receiving means comprises a pass-band coupler (not shown) and a balanced input transformer 10 having a primary winding 11 and a secondary winding 12; the primary winding 11 being connected through conductors 13 and 14 to the energy source and having a grounded center tap 15 and the secondary winding 12 having one end grounded and its opposite end 17 connected to the first stage of the filter network.

The first stage of the filter network of this invention is constructed to be in electrical series with the path of travel of the incoming frequency band and is designed to present a relatively high impedance to the frequency to be notched while presenting a relatively low impedance to the remaining frequencies in the band. Specifically, the series attenuating stage comprises a parallel resonant LC circuit including a coil 23 having a capacitor 24 in shunt therewith, and two serially connected capacitors 25 and 26 in shunt across capacitor 24. As will be discussed in greater detail hereinafter, in many instances it may be difficult, if not impossible to obtain the required turns ratio for the matching transformers (also discussed in greater detail hereinafter). Thus, the parallel resonant circuit will be transformer coupled to be in series with the path of travel of the incoming frequency band in order to reduce the required turns ratio of the matching transformers and to allow each first-stage element in a multinotch filter to operate at a separate, optimum impedance. Accordingly, coil 23 forms the secondary winding of a transformer 27 whose primary winding 28 is connected to the output of the input transformer 10. Specifically, one end of the winding 28 is connected to the output end of the input transformer 10, while the opposite end of the primary winding 28 is connected to a matching transformer means which couples the first stage of the filter network to the second stage of the network.

In order for the coil 23 to have optimum $Q$, the coil's inductance value is chosen specifically to have a high (optimum) $Q$ at the notch frequency, and the capacitors 24, 25 and 26 are then selected to resonate with the coil at the "notch" frequency. If a brief filter analysis is done on this series stage, such an analysis being omitted as such will be readily obvious to one skilled in the art, it can be seen that the impedance (hereinafter referred to as the line impedance) for such a series section is approximately equal to $2\pi L_s(f_0)^2/K(BW)$, where $L_s$ is the coil inductance value for optimum $Q$ at the notched frequency; $f_0$ the notched frequency; and $BW$ the desired bandwidth of the filter at 3db. This expression is normally divided by a proportionality constant $K$ which is different for each series stage. The value of this constant can be selected from standard design tables, e.g., if one desires a filter with a Butterworth response, he will select coefficients from a Butterworth table having entries appropriate for the number of stages desired.

The turns ratios of transformers 10 and 27 are designed to insure that the original line impedance is raised to the calculated value necessary to utilize the optimum $Q$ of the inductance selected for coil 23.

Coil 23, with capacitors 24, 25 and 26 form a resonant circuit for notching a single frequency band. To notch additional frequency bands with this stage, additional coils and capacitors similar to 28, 23, 24, 25 and 26 must be used, connected such that the primary coils similar to 28 are wired in electrical series. Naturally, because $f_0$ differs for each notch frequency band, the required line impedance will also differ. The required line impedances are established by suitably designing the turns ratio of each additional transformer which is similar to 27.

In the embodiment described, the shunt stages, such as 34, must operate at a rather low line impedance; thus, the required matching of the impedances between stages of the filter is provided by a suitably designed coupling means, in this instance being suitable matching transformers. Specifically, the first stage of the filter network is coupled to the second stage of the filter network through matching transformer 30 which has its primary winding 31 connected to primary winding 28 of the transformer 27 and its secondary winding 32 connected to the second stage of the filter network. As the construction of such matching transformers generally is well known, further discussion of the specific construction is omitted. It should be pointed out, however, that the response curve for the matching transformers should be flat over the range of frequencies being transmitted.

The second stage of the filter network comprises a series resonant circuit in electrical shunt to the path of travel of the frequency band. In this instance, the series resonant circuit comprises an inductor 34 (selected of the same value as inductor 23) which has connected in series therewith a parallel capacitor arrangement comprising a single capacitor 35 and two serially connected capacitors 36 and 37. Since this circuit is also designed to resonate at the "notch" frequency, it will present a relatively low impedance to the notched frequency while presenting a relatively high impedance to the remainder of the frequencies in the band so as not to cause substantial attenuation thereof.

If a brief filter analysis is approximated on this shunt section, it can be seen that the line impedance for such a section is approximately equal to $k2\pi(L_p)$ $(BW)$ where $L_p$ is the inductance value and $BW$ is again the bandwidth at 3db. Again, this expression is multiplied by $K$, a proportionality constant for the type response desired. From this brief analysis, it can be seen that if the same value of inductance is used to take advantage of its high $Q$, the line impedance of such a section will differ in this case be substantially less than the line impedance of the series section, so that the shifting of impedances by the matching transformers is necessary and required.

As was the case for the series stage, the elements 34, 35, 36, and 37 form a resonant circuit for notching only one frequency or band of frequencies. To notch additional bands with this stage, similar groups of elements are placed in electrical shunt with this group. Because $f_0$ is not in the mathematical expression relating $L_p$ to line impedance, all second stages are designed to operate at the same line impedance. The resonant frequencies are altered by suitably selecting the capacitors. Notably, capacitors (such as silver mica) have excellent $Q$'s for all reasonable capacitance values, and thus the impedance-shifting scheme is not necessary, as it is with the coils.

The second stage of the filter network is coupled to the third stage of the filter network via a matching transformer 40 whose primary winding 41 is connected to the secondary winding 32 of matching transformer 30, the second stage of the filter network being in electrical shunt with the transformer and also being connected to this junction, and whose secondary winding 42 is connected to the third stage of the filter network. Again, the matching transformer 40 provides the required matching of the line impedances between the stages of the filter.

The third stage of this filter network comprises a parallel resonant circuit in electrical series to the path of travel of the frequency band and includes an inductance coil 45 having two branches in parallel therewith, one branch including a single capacitor 46 and the other branch including two serially connected capacitors 47 and 48. Again, since the line impedance between stages may be so high that it is difficult to construct a matching transformer having the required turns ratio, and to provide for independent third-stage impedances in a multinotch filter, the parallel resonant circuit will be transformer coupled to be in series with the path of travel of the frequency band. Accordingly, the inductance coil 45 forms a secondary winding of a transformer 49 whose primary winding 50 has one end connected to the secondary winding of the matching transformer 40 and its opposite end coupled to the fourth stage of the filter network via matching transformer 53. This type network may be multiply-installed for multiple notches, as discussed hereinbefore.

Matching transformer 53 has a primary winding 54 connected to the primary winding 50 of transformer 49 and a secondary winding 55 connected to the fourth stage of the filter network, which in this instance comprises a series resonant circuit in electrical shunt to the frequency band.

The fourth stage of the filter network comprises one or more series resonant circuits in electrical shunt with the path of travel of the frequency band and includes an inductor 56 (again selected of the same value as inductors 23, 34 and 45) which has connected in series therewith a parallel circuit arrangement comprising a single capacitor 57 and two serially connected capacitors 58 and 59. This series resonant circuit is also designed to resonate at the notching frequency, as previously discussed in connection with the second stage of the filter network, in order to attenuate the notching frequency.

In order to couple the fourth stage of the filter network to the fifth stage thereof, matching transformer 61 is provided and includes a primary winding 63, which is connected to the junction of the secondary winding 55 of matching transformer 53 and the inductance coil 56, and a secondary winding 64 connected to the fifth stage of the filter network.

The fifth stage of the filter network comprises another (the third) parallel resonant circuit (or group of circuits) in electrical series with the path of travel of the frequency band. This parallel resonant circuit includes an inductance coil 67 having two branches in parallel therewith, one branch including a single capacitor 68 and the second branch including two serially connected capacitors 69 and 70. The inductor 67 will again form the secondary winding of a transformer 72 which has a primary winding 73 connected in series with the secondary winding 64 of coupling transformer 61. Once again, the resonant circuit will present a high impedance to the notching frequency while presenting a relatively low impedance to the remainder of the frequencies in the band so as to not substantially attenuate the remainder of the frequencies.

The fifth stage of the filter network is coupled to the sixth stage of the filter network via matching transformer 75 which has a primary winding 77, connected in series with the primary winding 73 of transformer 72, and a secondary winding 78 connected to the sixth stage of the filter, the matching transformer providing the necessary impedance matching between the fifth and sixth stages of the filter network.

The sixth stage of the filter network comprises a third series resonant circuit, or group of circuits, in electrical shunt to the path of travel of the frequency band and includes an inductance coil 80 which has connected in series therewith a parallel arrangement of a single capacitor 82 and two serially connected capacitors 83 and 84. As was the case for the second and fourth stages of the electrical filter network, the series resonant circuit presents a relatively low impedance to the notching frequency to cause substantial attenuation thereof while presenting a relatively high impedance to the remainder of the frequencies in the band.

Since only six stages in the filter network may be desired the sixth stage of the filter network is then coupled to means for supplying the "notched" frequency band to a circuit adapted to utilize such a band of energy. Specifically, the output means in this instance comprises an output transformer 85 having a primary winding 87, connected to the junction of the secondary winding 78 and the inductance 80, and a secondary winding 88, the secondary winding 88 being connected to a suitable circuit via conductors 89 and 90. Notably, the output impedance of transformer 85 may be chosen to be equal to the input impedance of transformer 10; in this manner, the filter may be readily inserted in electrical series with an existing signal path with a minimum of effort.

Briefly reviewing the operation of the above-described filter network, the first, third and fifth stages of the filter network (the parallel resonant series stages) will present a substantially high impedance to the notching frequency (or frequencies) to provide substantial attenuation thereof. However, just the reverse is true for the shunt stages (the series resonant stages) of the filter. Since they are in electrical shunt to the path of travel of the incoming frequency band, they present relatively low impedances to the notching frequency (or frequencies) to cause substantial attenuation thereof.

As readily can be observed, the number of stages in the filter will depend primarily upon the amount of attenuation desired. Where a greater or lesser degree of attenuation is required, then a greater or lesser number of stages will be utilized, the only distinction being that it will be necessary to adjust for the standard Butterworth or Tchebycheff coefficients $K$, for every resonant group in each stage of the filter. It is also readily seen that the matching transformers play an important function in the design of the filter network since they provide the necessary impedance matching between the stages of the filter. Also, where high impedances in one stage must be matched to a low impedance in an adjacent stage, it may be that a matching transformer of the required turns ratio cannot be constructed. Thus, it is sometimes necessary to transform or couple one or more of the parallel resonant circuits to the frequency band in order to increase or reduce the line impedances so that coils having optimum $Q$'s may be used.

Figure 2:
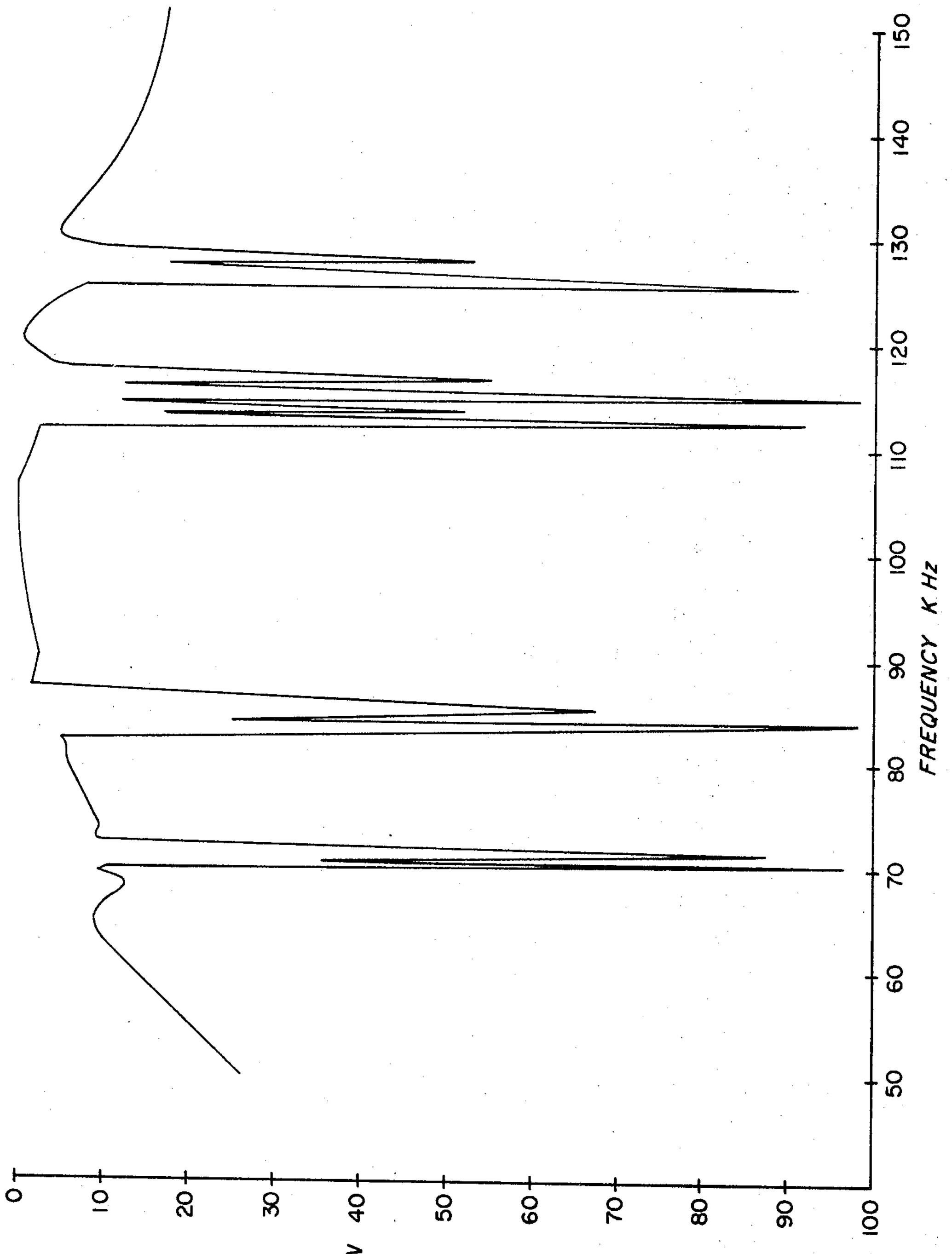
FIG. 2 is a response curve of one electrical filter network constructed in accordance with the principles of this invention, operating in series with a bandlimiting antenna coupler unit. Frequency is plotted against attenuation.

Referring briefly to FIG. 2, there is shown graphically the response curve of a 10-notch electric filter network constructed in accordance with the principles of the invention. As can readily be seen from the graph, the depth of the notches are relatively steep while the width thereof remains relatively narrow, resulting in a highly selective filter wherein only those frequencies derived to be "notched" are attenuated, the remainder of the frequencies passing through the filter substantially unattenuated.

While I have shown and described only a particular embodiment of this invention forming a multinotch Butterworth LC filter, it will be obvious to those skilled in the art that various changes and modifications may be made thereto without departing from this invention in its broader aspects. Thus, it is the intention of the appended claims to cover all such changes and modifications as fall within the true spirit and scope of this invention, including low-pass filters, band-pass filters, high pass filters, etc.

What I claim as new and novel and desire to secure by Letters Patent of the United States is:

1. A multistage electrical filter network for selectively notching at least one selected frequency from a frequency band comprising:

a. means for receiving said frequency band from a source thereof;

b. a plurality of attenuating means in electrical series with the path of travel of said frequency band and presenting a high impedance to the selected frequency while presenting a low impedance to the nonselected frequencies in said frequency band, each of said series attenuating means including a parallel LC network resonant at the selected frequency, said inductance values chosen to have optimum $Q$ at the selected frequency;

c. a plurality of attenuating means in electrical shunt with the path of travel of said frequency band, and presenting a low impedance to the selected frequency while presenting a high impedance to the nonselected frequencies in said frequency band, said series and said shunt attenuating means being alternately disposed in circuit relationship with one another, each of said shunt attenuating means comprising a series LC circuit resonant at the selected frequency, said inductance values chosen to have optimum $Q$ at the selected frequency;

d. transformer means electrically coupling adjacent attenuating means to each other and matching the impedances of said adjacent attenuating means to each other; and e. means for receiving the frequency band from the last of said attenuating means and for delivering the frequency band to an output circuit.

2. An electrical filter network as described in claim 1 wherein each of said series attenuating means comprises a transformer having a primary and a secondary winding, said primary winding being in electrical series with the path of travel of the said frequency band and said secondary winding having capacitance means in electrical shunt thereacross, said secondary winding and said capacitance means forming a parallel LC circuit resonant at the selected frequency, said secondary winding being of an inductance value to have optimum $Q$ at the selected frequency.

3. An electrical filter network as described in claim 2 wherein each secondary winding and shunt-stage inductance is substantially identical as to inductance value and $Q$.

4. A multistage passive electrical filter network for selectively notching a predetermined frequency from a band of energy comprising:

a. a first passive attentuating means in electrical series to the path of travel of the band of energy and presenting a high impedance to the selected frequency while presenting a low impedance to the nonselected frequencies in the band;

b. a first passive attenuating means in electrical shunt to the path of travel of the band of energy and presenting a low impedance to the selected frequency while presenting a high impedance to the nonselected frequencies in the band;

c. transformer means coupling said first series attenuating means to said first shunt attenuating means and matching the impedance of said first series attenuating means to said first shunt attenuating means;

d. a second passive attenuating means in electrical series to the path of travel of the band of energy and presenting a high impedance to the selected frequency while presenting a low impedance to the nonselected frequencies in the band;

e. transformer means coupling said second series attenuating means to said first shunt attenuating means and matching impedance of said second series attenuating means to said first shunt attenuating means;

f. a second passive attenuating means in electrical shunt to the path of travel of the band of energy and presenting a low impedance to the selected frequency while presenting a high impedance to the nonselected frequencies in the band;

g. transformer means coupling said second shunt attenuating means to said second series attenuating means and matching the impedance of said second shunt attenuating means to said second series attenuating means;

h. third passive attenuating means in electrical series to the path of travel of the band of energy and presenting a high impedance to the selected frequency while presenting a low impedance to the nonselected frequencies in the band;

i. transformer means coupling said third series attenuating means to said shunt attenuating means and matching the impedance of said third series attenuating means to said second shunt attenuating means;
j. third passive attenuating means in electrical shunt to the path of travel of the band of energy and presenting a low impedance to the selected frequency while presenting a high impedance to the nonselected frequencies in the band;
k. transformer means coupling said third shunt attenuating means to said third series attenuating means and matching the impedance of said third shunt attenuating means to said third series attenuating means;
l. each of said series attenuating means including a parallel LC circuit resonant at the selected frequency, each of said inductances being selected to be of optimum $Q$ at the "notch" frequency; and
m. each of said shunt attenuating means including a series LC circuit resonant at the "notch" frequency, each of said inductances being selected to be of optimum $Q$ at the "notch" frequency.

5. A filter network as described in claim 4 wherein each of said series attenuating means comprises a transformer having a primary winding and a secondary winding, each said secondary winding having connected thereacross capacitance means, said secondary winding and said capacitance means forming a parallel LC circuit resonant at the selected frequency, said secondary winding having optimum $Q$ at the "notch" frequency.

6. A filter network as described in claim 4 wherein the inductances in said parallel and series LC circuits are substantially identical as to value and $Q$, for any given "notch" frequency.

7. A filter network as described in claim 5 wherein each secondary winding is identical as to inductance value and $Q$.

8. A filter network for selectively "notching" a predetermined number of frequencies from a frequency band, the combination comprising:
a. means for receiving said frequency band from a source thereof;
b. a plurality of groups of series attenuating stages, each group containing a number of series connected filters equal to the number of predetermined frequencies;
c. a plurality of groups of parallel attenuating stages, each group containing a number of parallel connected stages equal to the number of predetermined frequencies;
d. transformer impedance matching means coupling adjacent groups of attenuating means to each other and matching the impedances of said adjacent groups to each other;
e. means for receiving the "notched" frequency band from the last of said groups; and
f. means for delivering the "notched" frequency band to an output circuit.

9. A filter network as described in claim 8, wherein each series and parallel group has one filter which has an inductance and $Q$ value which is substantially identical to one filter in each other group.

10. A filter network as described in claim 9, wherein each series connected filter comprises a transformer having a primary and a secondary winding, said primary winding being in electrical series with the path of travel of said frequency band and said secondary winding having capacitance means in electrical shunt thereacross, said secondary winding and said capacitance means forming a parallel LC circuit resonant at the selected frequency, said secondary winding being of an inductive value to have optimum $Q$ at the selected frequency.

11. A filter network as described in claim 10, wherein said means for receiving comprises a source impedance matching transforming means whereby the source impedance is coupled to the series LC circuit through the source transforming means and the series connected filter transformer.